United States Patent [19]

Walk et al.

[11] Patent Number: 4,715,656

[45] Date of Patent: Dec. 29, 1987

[54] HINGE JOINT FOR THE SEATS OF MOTOR VEHICLES AND THE LIKE

[75] Inventors: Hansjörg Walk, Reutlingen; Heinze-Jürgen Wagener, Remscheid, both of Fed. Rep. of Germany

[73] Assignee: Keiper Recaro GmbH & Co., Remscheid, Fed. Rep. of Germany

[21] Appl. No.: 881,195

[22] Filed: Jul. 2, 1986

[30] Foreign Application Priority Data

Jul. 2, 1985 [EP] European Pat. Off. ........... 85108181

[51] Int. Cl.$^4$ ....................... A47C 1/025; F16H 55/18
[52] U.S. Cl. ...................................... 297/362; 74/804
[58] Field of Search ............... 297/361, 362, 354, 355; 74/804, 805

[56] References Cited

U.S. PATENT DOCUMENTS

| | | | |
|---|---|---|---|
| 4,227,741 | 10/1980 | Gross et al. | 297/362 |
| 4,332,418 | 6/1982 | Strowik | 297/362 |
| 4,371,207 | 2/1983 | Wilking et al. | 297/362 X |
| 4,538,855 | 9/1985 | Peetz et al. | 297/362 |
| 4,582,360 | 4/1986 | Becker | 297/362 |

*Primary Examiner*—Kenneth J. Dorner
*Assistant Examiner*—Peter R. Brown
*Attorney, Agent, or Firm*—Peter K. Kontler

[57] ABSTRACT

The stationary component of a hinge joint between the lower part and the back of a seat in a motor vehicle is coupled to a pivotable component of the back of the seat by a shaft which carries an eccentric for the inner race of a ball bearing whose outer race is non-rotatably secured to a spur gear forming an integral part of the stationary component and mating with one or more teeth of an internal gear in the pivotable component. The outer race has a frustoconical internal surface engaged by the convex surface of a lever which is pivotally connected to and rotates with the shaft when the latter is turned by an operator to change the inclination of the back of the seat. An elastic pad or one or more springs are used to bias the eccentric radially of the shaft. The shaft is non-rotatably connected with but can move radially of the eccentric. The eccentric ensures that the teeth of the spur gear mate with the teeth of the internal gear without any play, and the lever ensures that the play between the teeth of the two gears is eliminated even if the tolerances in machining of these gears very in the circumferential direction of the gears.

18 Claims, 9 Drawing Figures

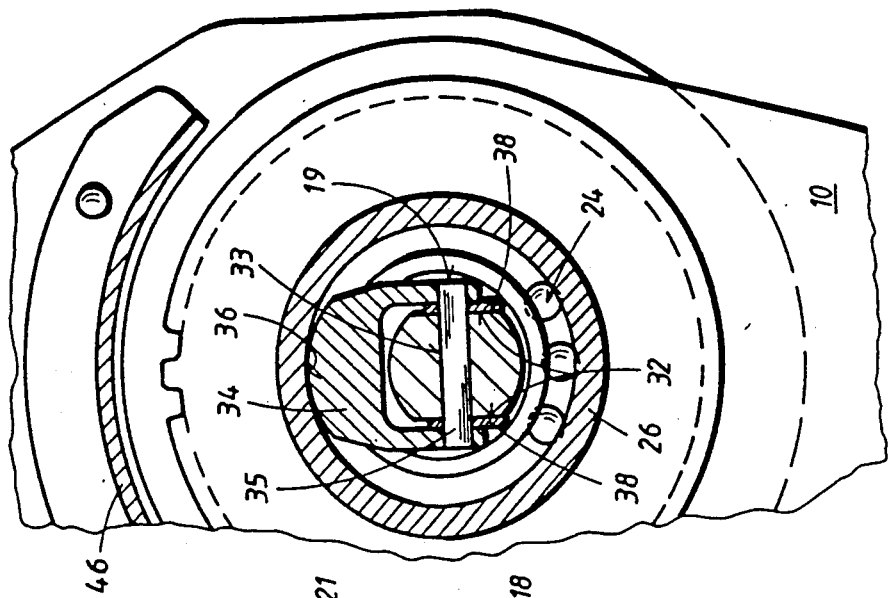
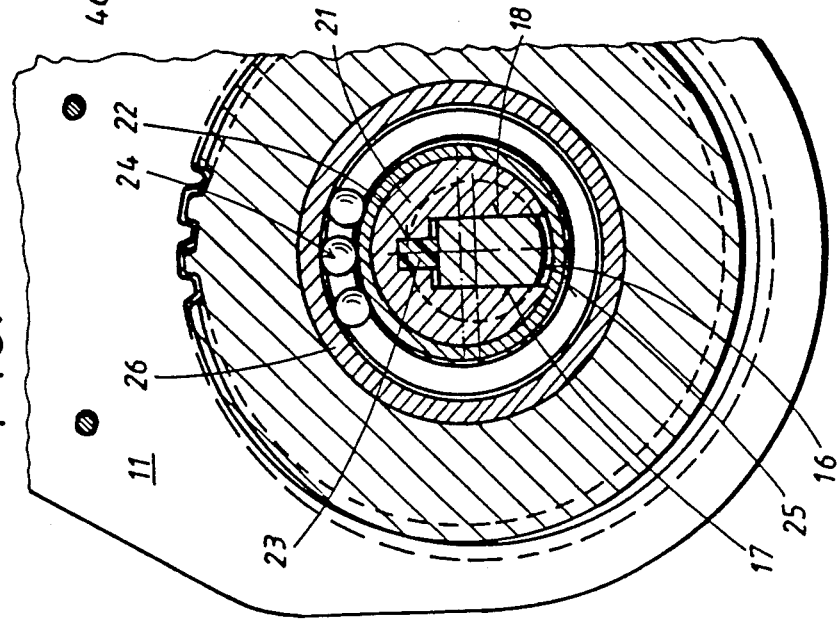
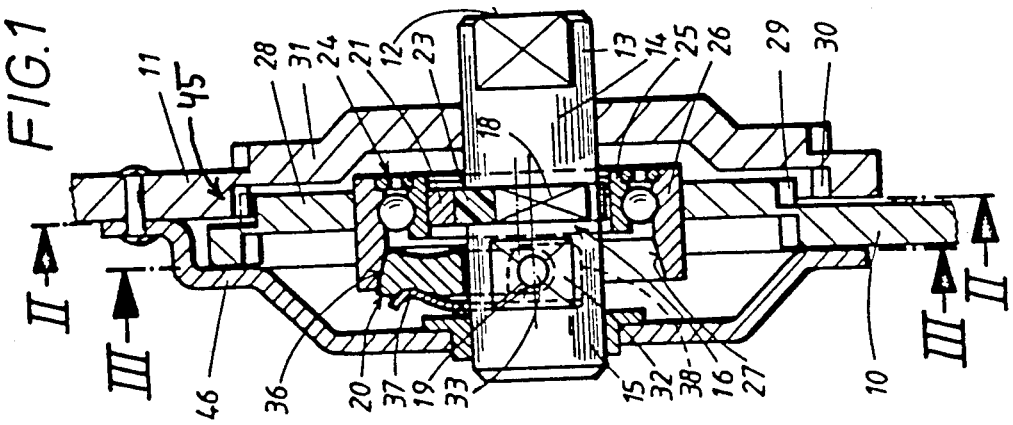

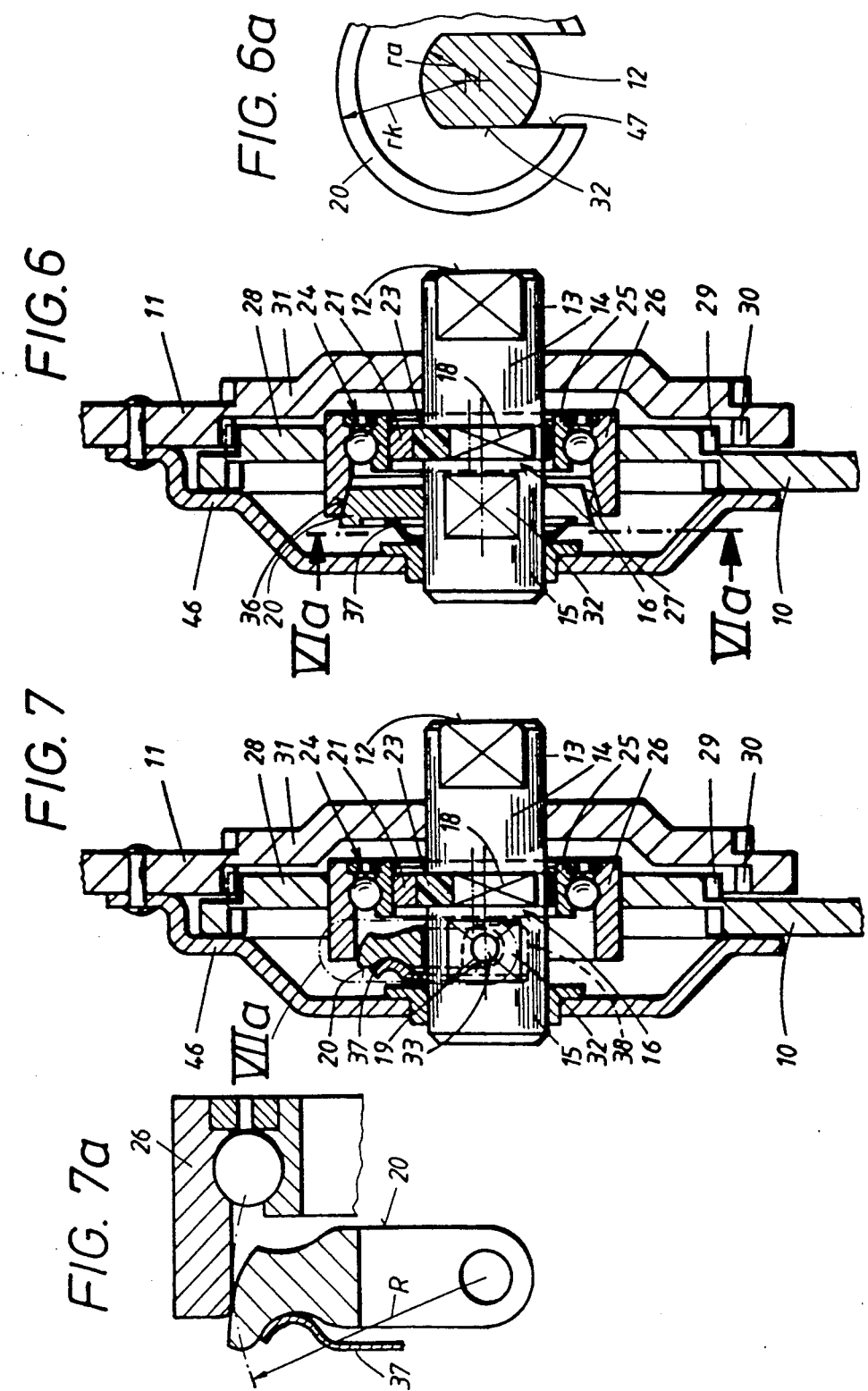

HINGE JOINT FOR THE SEATS OF MOTOR VEHICLES AND THE LIKE

BACKGROUND OF THE INVENTION

The invention relates to improvements in hinge joints of the class disclosed in the commonly owned U.S. Pat. No. 4,563,039 whose disclosure is incorporated herein by reference. More particularly, the invention relates to improvements in hinge joints which can be used in motor vehicles to adjustable connect a mobile (second) component (such as the back of a seat in a motor vehicle) with a stationary (first) component (such as the bottom part of the seat).

Commonly owned Geram Offenlegungsschrift No. 27 57 907 discloses a hinge joint wherein the means for movably connecting the second component of an adjustable seat to a stationary first component comprises a shaft which is surrounded by a C-shaped eccentric for the second component, and such eccentric is biased radially outwardly so as to increase the eccentricity of a (second) gear which is provided on the second component and must roll along a (first) gear on the first component when the second component is to be adjusted by changing its angular position with reference to the first component. The shaft is formed with two flats for complementary internal surfaces on the legs of the eccentric to ensure that the shaft and the eccentric can be rotated as a unit by means of a hand wheel or the like. The means for biasing the eccentric relative to the shaft can comprise a cushion or pad of elastomeric material, a package of dished springs or the like. The purpose of the biasing means is to urge the second gear radially into mesh with the first gear and to thus eliminate the possibility of radial wobbling irrespective of eventual machining tolerances and/or unavoidable play between the mating teeth of the two gears. This applies for the stage during which the second component is moved relative to the first component as well as for the stage or phase of idleness of the hinge joint, i.e., while the second component is held in a selected angular position. The biasing means must be installed under a certain initial stress in order to reliably prevent any stray movements, especially while the second component is held in a selected angular position. Such initial stressing of the biasing means necessitates the application of a reasonably large force when the occupant of the seat or another person desires to change the inclination of the back of the seat in a motor vehicle.

OBJECTS AND SUMMARY OF THE INVENTION

An object of the invention is to provide a novel and improved hinge joint which is constructed and assembled in such a way that the adjustment of the second component relative to the first component necessitates the exertion of a relatively small force even though the parts of the transmission between the two components are invariably held against stray movements relative to each other.

Another object of the invention is to provide a device (such as a seat) which embodies the above outlined hinge joint.

A further object of the invention is to provide a hinge joint which can be used as a superior substitute for conventional hinge joints in the seats of motor vehicles or the like and wherein the gears of the first and second components are held against wobbling and/or other stray movements in a novel and improved way.

An additional object of the invention is to provide the hinge joint with novel and improved means for urging the gear or gears on the second component into mesh with the gear or gears on the first component during each stage of utilization of the hinge joint.

Still another object of the invention is to provide a hinge joint which is more reliable, more versatile and easier and simpler to manipulate than heretofore known hinge joints even though it is just as compact as (or even more compact than) heretofore known hinge joints.

A further object of the invention is to provide a hinge joint which embodies all of the above outlined features even though the number of its parts need not exceed the number of parts in a conventional hinge joint.

The invention is embodied in a hinge joint which can be used with particular advantage to change the mutual positions of two parts in a motor vehicle or the like. The improved hinge joint comprises a first component (such first component can constitute a fixedly mounted part of the seat in a motor vehicle, a second component (e.g., a portion of the pivotable back of the seat), and means for selectively changing the position of the second component relative to the first component. The changing means comprises a shaft which is rotatably journalled in one of the components, a first gear on the first component, a second gear which is provided on the second component to mate with the first gear and surrounds the shaft, an eccentric which is interposed between the shaft and the second gear and is movable radially of the shaft, and means for yieldably biasing the eccentric radially of the shaft so as to increase the eccentricity of the gears relative to each other. The hinge joint further comprises means for moving one of the gears radially of the shaft relative to the other gear.

The second gear preferably comprises a rotary hub which surrounds the eccentric, and the moving means preferably comprises a portion which is movable substantially axially of the shaft and bears against the hub. Such portion of the moving means can comprise or constitute a lever, and the moving means can further comprise means for pivotally connecting the lever to the shaft. Alternatively, the moving means can comprise a ring which is movable substantially axially of the shaft.

The second gear can comprise an externally toothed annular portion and an antifriction bearing between the annular portion and the eccentric. The bearing can include a race which constitutes the aforementioned hub and is rigid with the toothed annular portion of the second gear and abuts the moving means. The race can be provided with a conical internal surface which abuts the moving means.

The aforementioned lever of the moving means abuts the second gear and can comprise two arms which flank the shaft. The moving means then further comprises pivot means connecting the arms to the shaft so that the lever can pivot about an axis extending substantially at right angles to the axis of the shaft. The shaft can be provided with flats adjacent to the arms of the lever, and the second gear can be provided with the aforementioned conical surface (preferably an internal surface) which abuts the lever. The lever of such hinge joint can be provided with a second surface which slopes toward the axis of the shaft in a direction toward the eccentric and abuts the conical surface. The second surface can be substantially convex in the circumferential direction of the conical surface and/or in the circumferential direction of the pivot means for the lever.

The moving means can comprise a displacing member (such as the aforementioned lever) which is movably mounted on the shaft, and resilient means (such as a diaphragm spring or a leaf spring) for urging the displacing member against the second gear. The leaf spring or a similar resilient element can be attached to the aforementioned pivot means which articulately connects the lever to the shaft.

The novel features which are considered as characteristic of the invention are set forth in particular in the appended claims. The improved hinge joint itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal sectional view of a hinge joint which embodies one form of the invention;

FIG. 2 is a transverse sectional view as seen in the direction of arrows from the line II—II of FIG. 1;

FIG. 3 is a transverse sectional view as seen in the direction of arrows from the line III—III of FIG. 1;

FIG. 6 is a longitudinal sectional view of a further hinge joint;

FIG. 6a is a fragmentary sectional view as seen in the direction of arrows VIa—VIa in FIG. 6;

FIG. 7 is a longitudinal sectional view of an additional hinge joint; and

FIG. 7a is an enlarged view of a detail within the phantom line VIIa in FIG. 7.

DESCRIPTION OF THE PREFERRED EMBODIMENTS

Figure 4:
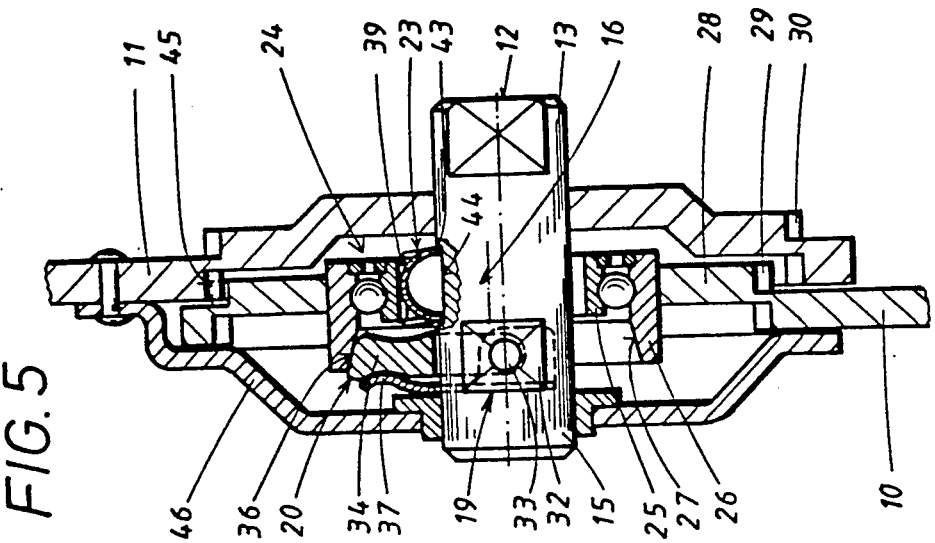
FIG. 4 is a longitudinal sectional view of a modified hinge joint.

The hinge joint which is shown in FIGS. 1 to 3 comprises a first component 10 which can constitute a stationary part of the seat in a motor vehicle, and a second component 11 which can constitute a part of the pivotable back of such seat. The means for selectively changing the position of the component 11 relative to the component 10 comprises a coupling element in the form of a shaft 12 having an exposed torque receiving portion 13 with one or more flats engageable by the flats in the hub of a hand wheel or the like, e.g., in a manner as shown in the aforementioned U.S. Pat. No. 4,563,039. The shaft 12 further comprises two coaxial cylindrical portions 14, 15 flanking a torque transmitting portion 16 with two parallel flats 17, 18. A further portion 19 of the shaft 12 between the portions 15 and 16 serves to support a diametrically extending pivot member 35 which connects the shaft 12 with a displacing member in the form of a lever 34 forming part of a means 20 for moving the shaft 12 radially of a spur gear 28.

The portion 16 of the shaft 12 is partially surrounded by a substantially C-shaped eccentric 21 having a rectangular recess bounded by two parallel surfaces which abut the flats 17, 18 so as to hold the eccentric against rotation relative to the shaft 12 but to permit the shaft to move radially of the eccentric toward and away from a position of maximum eccentricity. The central portion or web of the eccentric 21 has a pocket or recess 22 for an elastic cushion or pad 23 which biases the shaft 12 radially of the eccentric 21 toward the position of maximum eccentricity of the shaft portion 16.

The eccentric 21 is surrounded by the inner race 25 of an antifriction ball bearing 24 whose outer race 26 extends axially beyond the inner race 25 toward the end portion 15 of the shaft 12 and has a frustoconical internal surface 27 surrounding a part of or the entire portion 19 of the shaft. The outer race 26 is rigid or integral with the radially innermost portion of the spur gear 28. For example, the race 26 can be a press fit in the central opening of the gear 28. Such press fit is not necessary if the race 26 is bolted or otherwise affixed to the gear 28 or if the latter is provided with an integral sleeve which replaces a discrete race. The illustrated antifriction ball bearing 24 can be replaced with a simple friction bearing including the race 26 or an equivalent thereof. The race 26 is then maintained in direct contact with the external surface of the eccentric 21 and has a frustoconical internal surface 27. The diameter of the eccentric 21 can be increased so that the eccentric can define a friction bearing with a sleeve or race whose inner diameter matches or approximates that of the race 26 of FIGS. 1 to 3. The utilization of an antifriction bearing in lieu of a friction bearing is preferred at this time because such bearing renders it possible to adjust the inclination of the component 11 in response to exertion of a relatively small force.

The spur gear 28 is an integral part of the component 10 and constitutes a depressed central portion of the component 10. Reference may be had to U.S. Pat. No. 4,563,039. The active external teeth 29 of the spur gear 28 mate with one or more internal teeth forming part of an internal gear 30. The gear 30 surrounds a central part 31 which is an integral (depressed) portion of the component 11 and surrounds the portion 14 of the shaft 12. The component 11 is riveted or otherwise rigidly connected to an end plate 46 which is rotatably mounted on the end portion 15 of the shaft 12. As shown in FIG. 1, a bearing sleeve can be interposed between the shaft portion 15 and the radially innermost portion of the end plate 46. The end plate 46 cooperates with the central portion 31 of the component 11 to hold the component 10 against axial movement relative to the shaft 12.

The number of teeth 29 on the spur gear 28 equals m-n wherein m is the number of teeth on the gear 30 and n is a whole number including one. The root circle diameter of the internal gear 30 exceeds the addendum circle diameter of the spur gear 28 by not less than the depth of a tooth 29 (i.e., at least by the distance between the root portion and the top land of a tooth 29 as considered in the radial direction of the spur gear 28). The eccentricity of the eccentric 21 with reference to the cylindrical portions 14, 15 of the shaft 12 can equal or approximate the difference between the radius of the root circle of the internal gear 30 and the radius of the addendum circle of the spur gear 28. Radial movability of the shaft 12 relative to the eccentric 21 and the elastic pad 23 render it possible to increase or reduce the eccentricity of the eccentric with reference to the portions 14 and 15 of the shaft 12. The extend to which the eccentricity can be varied depends on the elasticity of the material of the pad 23.

The portion 19 of the shaft 12 has two parallel flats 32 (FIG. 3) extending at right angles to the axis of a diametrically extending bore 33 for the aforementioned pivot member 35 which articulately connects the lever 34 of the moving means 20 to the shaft 12. The lever 34 is bifurcated and its arms flank the flats 32. Such arms can pivot about the axis of the pivot member 35. That portion of the lever 34 which is remotest from the pivot member 35 has an external surface 36 which is inclined toward the eccentric 21 and toward the axis of the shaft 12 and is convex in the circumferential direction of the pivot member 35 as well as in the circumferential direction of the frustoconical internal surface 27 in the adjacent end portion of the outer race 26 of the antifriction bearing 24. A leaf spring 37 is provided to urge the lever 34 in a clockwise direction as seen in FIG. 1 so as to maintain the external surface 36 in contact with the internal surface 27. The legs 38 of the substantially U-shaped leaf spring 37 are adjacent to the flats 32 of the shaft portion 19 and are mounted on the respective end portions of the pivot member 35. Other suitable means for urging the surface 36 against the surface 27 can be used with equal or similar advantage.

When a hand wheel or a lever which is used to turn the shaft 12 is actuated, the portion 16 of the shaft 12 rotates the eccentric 21 and the latter rotates with the inner race 25 of the antifriction bearing 24. This causes the locus 45 of engagement between the teeth 29 of the spur gear 28 and the teeth of the internal gear 30 to turn about the axis of the shaft 12. The angular movement of the shaft 12 entails the generation of radial forces which are attributable to unavoidable tolerances in the making of the gears 28 and 30. The internal gear 30 moves radially toward the axis of the shaft 12 against the opposition of the pad 23 or radially outwardly under the bias of the pad 23 and to an extent which is determined by the tolerances in the machining and/or any other procedure involving the making of the gears 28 and 30. The gear 30 is moved by the pad 23 because the component 11 is mounted on the coaxial portions 14 and 15 of the shaft 12. If the axis of the shaft 12 moves downwardly (as seen in FIGS. 1 to 3), the lever 34 is pivoted in a clockwise direction to move its surface 36 nearer to the axis of the shaft portion 16. If the axis of the shaft 12 is moved upwardly, the lever 34 is pivoted in a counterclockwise direction against the opposition of the leaf spring 37. This entails the generation of sliding friction between the internal surface 27 of the outer race 26 and the surface 36 of the lever 34. When the transmission of torque to the shaft 12 is terminated, the selected positions of teeth of the gears 28 and 30 at the locus 45 of engagement remain unchanged because the moving means 20 contributes to retention of the gear 30 in the newly selected position. At such time, friction between the surfaces 27 and 36 is a static friction. All that is necessary is to select the inclination of the internal surface 27 and the configuration and inclination of the surface 36 in such a way that the engagement between the lever 34 and the outer race 26 is self-locking, i.e., that the selected angular position of the gear 30 remains unchanged until and unless the operator decides to turn the shaft 12 about its axis.

An important advantage of the improved hinge joint is that the shaft 12 need not lock the gears 28 and 30 in selected angular positions (when the shaft 12 is not rotated) as well as eliminate play between the teeth of the gears 28, 30 when the shaft is rotated by a hand wheel or the like. One of these functions is performed by the moving means 20 including the lever 34 or the aforementioned axially movable ring.

The antifriction bearing 24 renders it possible to adjust the inclination of the component 11 with the exertion of a small force.

The portion 16 of the shaft 12 is mounted in the fixed component 10 so that an angular movement of the shaft 12 entails a movement of the common axis of the portions 14 and 15 (mounting the component 11) about the axis of the eccentric 21. The pad 23 thereby changes the radial position of the shaft portion 16 relative to the inner race 25 in such a way that one or more teeth of the spur gear mate with the adjacent tooth or teeth of the internal gear 30 without any play. The bias of the pad 23 ensures the elimination of such play, and all radial forces which develop during rotation of the shaft 12 are taken up by the bearing 24. The race 25 in non-rotatably connected to the eccentric 21, and the race 26 is non-rotatably mounted in, or is made integral with, the spur gear 28.

The provision of the internal surface 27 in the outer race 26 and of the moving means 20 ensures that the eccentricity of the eccentric 21 conforms to eventual tolerances between the teeth of the gears 28, 30 in different angular positions of the gear 30 relative to the gear 28. It is equally within the purview of the invention to replace the frustoconical internal surface 27 with a cylindrical internal surface and to replace the surface 36 of the lever 34 with a helical surface extending in the direction of pivotal movement of the lever. The spring 37 ensures that the surface 36 remains in contact with the surface 27 regardless of eventual differences in tolerances between the teeth of the gears 28 and 30 in the circumferential direction of the gear 28.

The lever 34 of the moving means 20 shares all angular movements of the shaft 12. The bias of the leaf spring 37 need not be very pronounced; all that is normally necessary is to ensure that the surface 36 of the lever 34 remains in continuous contact with the internal surface 27. As mentioned above, the inclination of the surfaces 27 and 36 is preferably such that they establish a self-locking action as soon as the angular movement of the shaft 12 is terminated. The gears 28 and 30 then remain in mesh without any or with negligible play. When the shaft 12 is rotated again, and if the play between the teeth of the gears 28, 30 varies in response to rotation of the gear 30 relative to the gear 28 due to differences in manufacturing tolerances in the circumferential direction of these gears, static friction between the surfaces 27, 36 is reduced to sliding friction and the lever 34 pivots about the axis of the pin 35 to compensate for such differences in tolerances. The moment of friction between the lever 34 and the outer race 26 (when the shaft 12 is rotated) is negligible; therefore, the force which is required to turn the shaft 12 and the lever 34 about the axis of the eccentric 21 is relatively small.

FIG. 4 shows a modified hinge joint wherein the shaft 12 has a modified portion 16 for the eccentric. The inner race 25' of the antifriction ball bearing 24 is eccentric with reference to and surrounds the portion 16 of the shaft 12. The internal surface of the race 25' is provided with two grooves 39 and 40 which are parallel to the axis of the shaft 12 and are disposed diametrically opposite each other. The grooves 39 and 40 receive the respective end portions of a torque transmitting pin or stud 41 which is reciprocable in a diametrically extending bore 42 of the shaft 12. The head of the pin 41 extends into the groove 39 and is disposed radially outwardly of an elastic biasing device 23 including one or more elastomeric pads, one or more springs or the like.

The construction of all other parts of the hinge joint of FIG. 4 is or can be identical with or analogous to the construction of the corresponding parts in the hinge joint of FIGS. 1 to 3.

Figure 5:
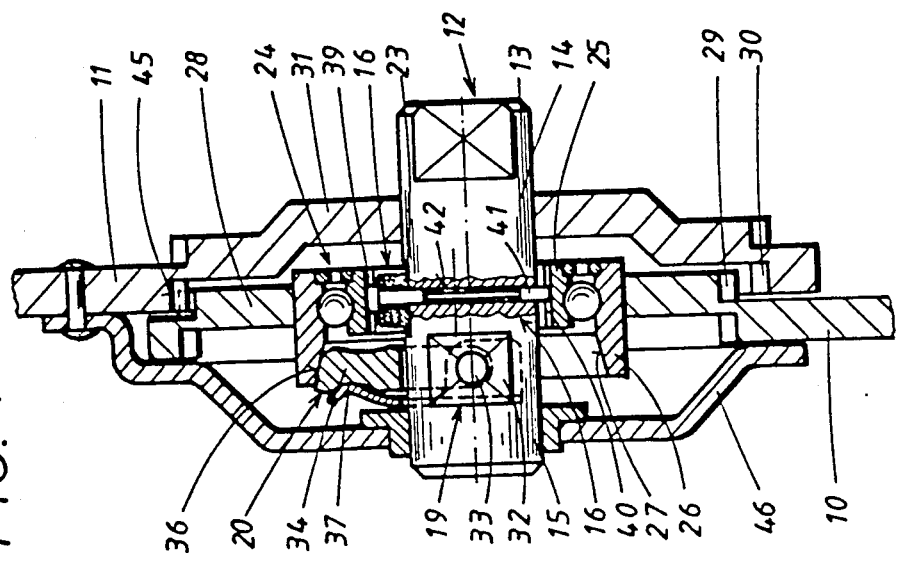
FIG. 5 is a longitudinal sectional view of a third hinge joint.

The hinge joint of FIG. 5 has an antifriction ball bearing 24 with an inner race 25' which constitutes the eccentric and is biased radially of the shaft 12 by a biasing device 23 including yoke-like spring 43 which abuts a flat 44 of the shaft 12 and extends into an internal groove 39 of the inner race 25'. The flat 44 (actually the shoulders at the axial ends of the flat) serves to hold the spring 43 against axial movement along the shaft 12. The gear 30 is held in a selected position by the spring 43 on the one hand and by the teeth 29 and the adjacent tooth or teeth of the internal gear 30 (at the locus 45) on the other hand. The reaction forces are transmitted to the shaft 12 by way of the end plate 46 and the radially innermost portion of the component 11.

FIGS. 6–6a and 7–7a respectively show two additional embodiments of the improved hinge joint.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A hinge joint, particularly for changing the mutual positions of two parts of a seat in a motor vehicle or the like, comprising a first component; a second component; means for selectively changing the position of said second component relative to said first component including a shaft rotatably journalled in one of said components, a first gear on said second component, a second gear provided on said first component, mating with said first gear and surrounding said shaft, an eccentric interposed between said shaft and said second gear and movable radially of said shaft, and means for yieldably biasing said eccentric radially of said shaft so as to increase the eccentricity of said first and second gears with reference to each other, said second gear having a rotary hub which surrounds said eccentric; and means for moving one of said first and second gears radially of said shaft relative to the other of said first and second gears, comprising a portion which is movable substantially axially of said shaft and means for urging said portion of said moving means substantially axially of said shaft and against said hub.

2. The hinge joint of claim 1, wherein said portion of said moving means includes a lever and said moving means further comprises means for pivotally connecting said lever to said shaft.

3. The hinge joint of claim 1, wherein said moving means comprises a ring which surrounds and is movable substantially axially of said shaft.

4. The hinge joint of claim 1, wherein said second gear comprises an externally toothed annular portion and an antifriction bearing between said annular portion and said eccentric, said bearing including a race which is rigid with said annular portion and abuts said moving means.

5. The hinge joint of claim 4, wherein said race has a substantially conical internal surface abutting said moving means.

6. The hinge joint of claim 1, wherein said moving means comprises a displacing member movably mounted on said shaft and said urging means uncludes resilient means for biasing said displacing member against said second gear.

7. The hinge joint of claim 6, wherein said urging means comprises a leaf spring on said shaft.

8. The hinge joint of claim 1, further comprising an antifriction bearing having a first race rigid with said second gear and a second race rigid with said eccentric.

9. The hinge joint of claim 8, wherein said second race has an internal surface provided with two axially parallel grooves which disposed diametrically opposite each other, and further comprising a stud which extends diametrically of and is reciprocable relative to said shaft, said stud having end portions extending into said grooves and said biasing means being disposed between said shaft and said surface of said second race and being arranged to bias said shaft and said second race radially of said shaft by way of said stud.

10. The hinge joint of claim 1, wherein said biasing means includes a substantially yoke-like spring disposed between said shaft and said eccentric.

11. The hinge joint of claim 10, further comprising an antifriction bearing having an outer race rigid with said second gear and an inner race constituting said eccentric and having an internal groove for a portion of said yoke-like spring.

12. A hinge joint, particularly for chaning the mutual positions of two parts of a seat in a motor vehicle or the like, comprising a first component; a second component; means for selectively changing the position of said second component relative to said first component including a shaft rotatably journalled in one of said components, a first gear on said second component, a second gear provided on said first component, mating with said first gear and surrounding said shaft, an eccentric interposed between said shaft and said second gear and movable radially of said shaft, and means for yieldably biasing said eccentric radially of said shaft so as to increase the eccentricity of said first and second gears with reference to each other; and means for moving one of said first and second gears radially of said shaft relative to the other of said first and second gears, comprising a lever having two arms flanking said shaft, means for maintaining said lever in abutment with said second gear, and pivot means connecting said arms to said shaft.

13. The hinge joint of claim 12, wherein said shaft has flats adjacent said arms and said second gear has a conical internal surface abutting said lever.

14. The hinge joint of claim 13, wherein said lever has a second surface which slopes toward the axis of said shaft in a direction toward said eccentric and abuts said conical surface.

15. The hinge joint of claim 14, wherein said second surface is substantially convex in the circumferential direction of said shaft.

16. The hinge joint of claim 14, wherein said pivot means has a substantially cylindrical peripheral surface and said second surface is substantially convex in the circumferential direction of said pivot means.

17. A hinge joint, particularly for changing the mutual positions of two parts of a seat in a motor vehicle or the like, comprising a first component; a second component; means for selectively changing the position of said second component relative to said first component including a shaft rotatably journalled in one of said components, a first gear on said second component, a second gear provided on said first component, mating with said first gear and surrounding said shaft, an eccentric interposed between said shaft and said second gear and movable radially of said shaft, and means for yieldably biasing said eccentric radially of said shaft so as to increase the eccentricity of said first and second gears with reference to each other; and means for moving one of said first and second gears radially of said shaft relative to the other of said first and second gears, comprising a displacing member including a lever movably mounted on said shaft, resilient means including a leaf spring for urging said displacing member against said second gear, and means for pivotally connecting said lever to said shaft, said leaf spring being attached to said connecting means.

18. A hinge joint, particularly for changing the mutual positions of two parts of a seat in a motor vehicle or the like, comprising a first component; a second component; means for selectively changing the position of said second component relative to said first component, including a shaft rotatably journalled in one of said components, a first gear on said second component, a second gear provided on said first component, mating with said first gear and surrounding said shaft, an eccentric interposed between said shaft and said second gear and movable radially of said shaft, and means for yieldably biasing said eccentric radially of said shaft so as to increase the eccentricity of said first and second gears with reference to each other; and means for moving one of said first and second gears radially of said shaft relative to the other of said first and second gears, comprising a displacing member mounted on said shaft for pivotal movement about an axis which extends at right angles to the axis of said shaft and resilient means for urging said displacing member against said second gear.

* * * * *